(12) United States Patent
Kilmer et al.

(10) Patent No.: US 10,762,535 B2
(45) Date of Patent: Sep. 1, 2020

(54) CLIENT-BASED DEAL FILTERING AND DISPLAY

(71) Applicant: LivingSocial, Inc., Washington, DC (US)

(72) Inventors: Richard Kilmer, Washington, DC (US); Douglas March, Washington, DC (US)

(73) Assignee: LivingSocial, Inc., Washington, DC (US)

( * ) Notice: Subject to any disclaimer, the term of this patent is extended or adjusted under 35 U.S.C. 154(b) by 471 days.

(21) Appl. No.: 14/924,173

(22) Filed: Oct. 27, 2015

(65) Prior Publication Data

US 2016/0048884 A1    Feb. 18, 2016

Related U.S. Application Data

(63) Continuation of application No. 13/708,663, filed on Dec. 7, 2012, now abandoned.

(60) Provisional application No. 61/706,260, filed on Sep. 27, 2012.

(51) Int. Cl.
*G06Q 30/02* (2012.01)
*G06F 3/0484* (2013.01)

(52) U.S. Cl.
CPC ..... *G06Q 30/0269* (2013.01); *G06F 3/04842* (2013.01); *G06F 3/04845* (2013.01); *G06F 3/04847* (2013.01)

(58) Field of Classification Search
CPC ....................................... G06Q 30/0207–0277
See application file for complete search history.

(56) References Cited

U.S. PATENT DOCUMENTS

| | | | |
|---|---|---|---|
| 7,149,704 B2 | 12/2006 | Martin et al. | |
| 7,181,488 B2 | 2/2007 | Martin et al. | |
| 8,015,117 B1 | 9/2011 | Lillibridge et al. | |
| 2006/0224997 A1 | 10/2006 | Wong et al. | |
| 2006/0288023 A1* | 12/2006 | Szabo | G06Q 30/02 |
| 2007/0263007 A1 | 11/2007 | Robotham et al. | |
| 2007/0271297 A1* | 11/2007 | Jaffe | G06F 17/30041 |
| 2009/0043738 A1 | 2/2009 | James et al. | |
| 2009/0124241 A1* | 5/2009 | Krishnaswamy | G06Q 30/02 |
| | | | 455/414.2 |

(Continued)

FOREIGN PATENT DOCUMENTS

| | | |
|---|---|---|
| KR | 727038 B1 | 6/2007 |
| KR | 2011060786 A | 6/2011 |

(Continued)

OTHER PUBLICATIONS

Office Action for corresponding U.S. Appl. No. 13/708,663 dated Jan. 12, 2015.

(Continued)

*Primary Examiner* — David J Stoltenberg
(74) *Attorney, Agent, or Firm* — Alston & Bird LLP

(57) ABSTRACT

Various implementations relate to a system that provides a collection of deals to a mobile application on a client device. The mobile application then filters the deals based on relevance using a user profile within the client device, and displays the deals to a user. The display of the deals may be governed by the relevance of the respective deals as determined by matching of the deals with the user profile within the client device.

27 Claims, 11 Drawing Sheets

(56) References Cited

U.S. PATENT DOCUMENTS

| | | | |
|---|---|---|---|
| 2009/0125321 A1* | 5/2009 | Charlebois | G06Q 30/02 705/346 |
| 2009/0153492 A1 | 6/2009 | Popp | |
| 2009/0216639 A1* | 8/2009 | Kapczynski | G06F 17/30569 705/14.1 |
| 2009/0271228 A1 | 10/2009 | Bilenko et al. | |
| 2010/0073391 A1 | 3/2010 | Horowitz et al. | |
| 2010/0293056 A1* | 11/2010 | Flynt | G06F 3/0481 705/14.58 |
| 2011/0063301 A1* | 3/2011 | Setlur | G09B 29/007 345/441 |
| 2011/0213655 A1* | 9/2011 | Henkin | G06Q 30/0251 705/14.49 |
| 2011/0238608 A1* | 9/2011 | Sathish | G06Q 30/0631 706/47 |
| 2011/0313649 A1* | 12/2011 | Bales | G01C 21/20 701/455 |
| 2011/0314372 A1* | 12/2011 | Teevan | G06F 17/211 715/255 |
| 2012/0078918 A1* | 3/2012 | Somasundaran | G06F 17/278 707/748 |
| 2012/0233191 A1* | 9/2012 | Ramanujam | G06F 16/9535 707/758 |
| 2012/0233557 A1 | 9/2012 | Wakhlu | |
| 2012/0246098 A1* | 9/2012 | Chari | G06N 20/00 706/12 |
| 2012/0259695 A1* | 10/2012 | Glassman | G06Q 30/02 705/14.41 |
| 2012/0316969 A1 | 12/2012 | Metcalf, III | |
| 2013/0013595 A1* | 1/2013 | Tseng | G06F 17/30867 707/723 |
| 2013/0014040 A1* | 1/2013 | Jagannathan | H04M 1/72586 715/765 |
| 2013/0024812 A1* | 1/2013 | Reeves | G09G 5/14 715/810 |
| 2013/0036165 A1* | 2/2013 | Tseng | G06Q 30/02 709/204 |
| 2013/0038635 A1* | 2/2013 | Bales | G01C 21/20 345/660 |
| 2013/0054366 A1 | 2/2013 | Roundtree et al. | |
| 2013/0067398 A1* | 3/2013 | Pittappilly | G06F 3/0482 715/800 |
| 2013/0212484 A1* | 8/2013 | Joshi | G06F 3/04842 715/740 |
| 2013/0218729 A1* | 8/2013 | Cranfill | G06F 17/30011 705/27.1 |
| 2014/0089092 A1* | 3/2014 | Kilmer | G06Q 30/0269 705/14.58 |

FOREIGN PATENT DOCUMENTS

| | | |
|---|---|---|
| KR | 2012032290 A | 4/2012 |
| WO | WO2014052606 A1 | 4/2014 |

OTHER PUBLICATIONS

Office Action for corresponding U.S. Appl. No. 13/708,663 dated Apr. 5, 2013.

Office Action for corresponding U.S. Appl. No. 13/708,663 dated Jun. 26, 2013.

Notification of Transmittal of the International Search Report and the Written Opinion of the International Search Authority, or the Declaration dated Jan. 21, 2014 from Corresponding International Application No. PCT/US2013/061941, 11 pages.

* cited by examiner

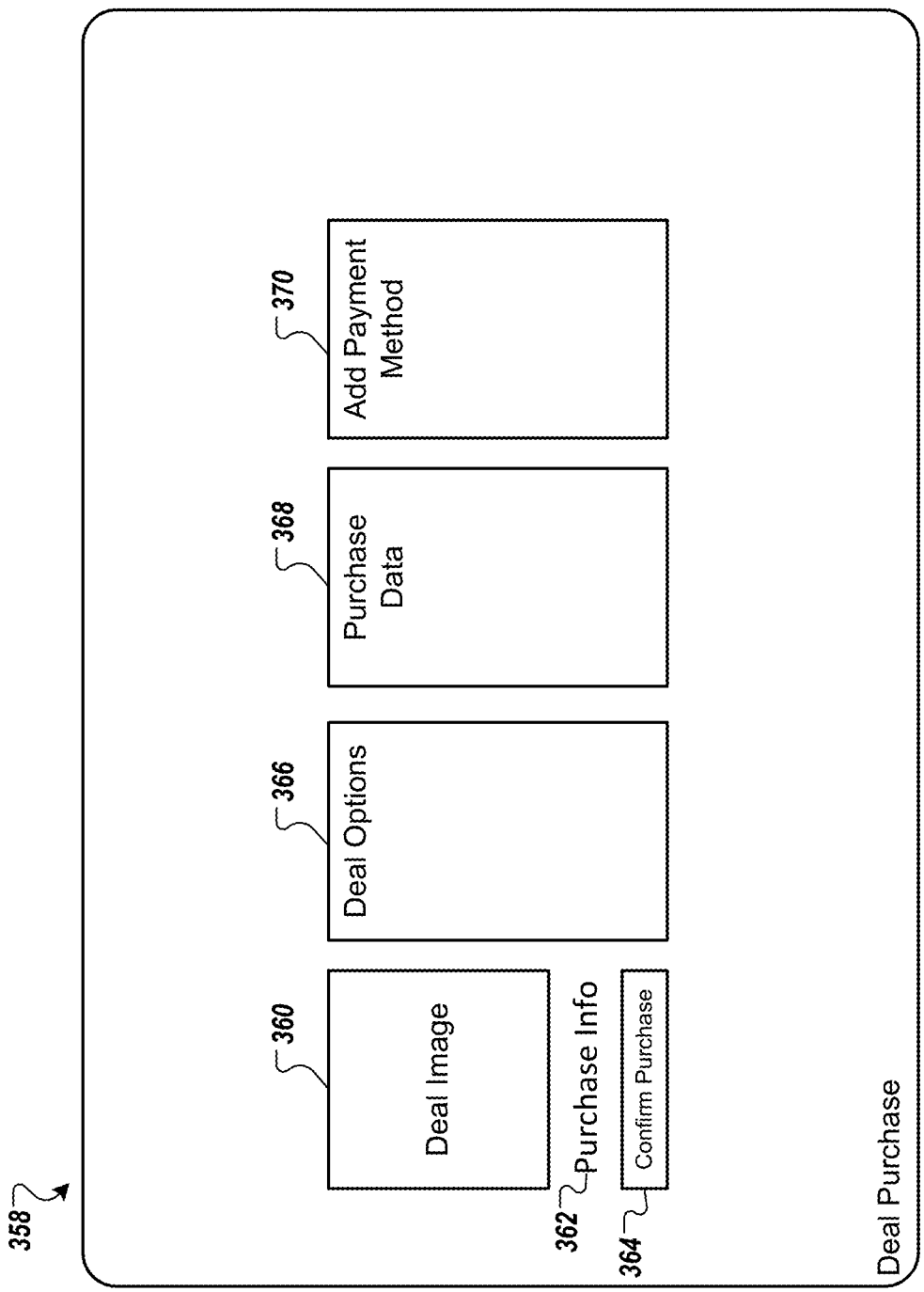

CLIENT-BASED DEAL FILTERING AND DISPLAY

CROSS-REFERENCE TO RELATED APPLICATIONS

This application is a continuation application of and claims priority to and the benefit of U.S. application Ser. No. 13/708,663, filed on Dec. 7, 2012, and also claims priority to and the benefit of U.S. Provisional Application Ser. No. 61/706,260, filed Sep. 27, 2012, the disclosures of which are incorporated herein by reference in their entireties.

TECHNICAL FIELD

This specification generally relates to receiving, filtering, and displaying merchant deals at a client device.

BACKGROUND

Computer systems and communication networks enable merchants to offer and sell products and services to consumers. Deal brokerages facilitate interaction between merchants and consumers by providing websites, web-based applications, mobile applications, and online services to support various processes and transactions involved with the buying and selling of products and services. In particular, deal brokerages provide deals on products and services to consumers.

SUMMARY

In general, one aspect of the subject matter described in this specification may include the actions of obtaining, at the client device, a collection of deals, wherein each deal comprises a value for each of a plurality of attributes; obtaining, at the client device, a profile of a user, the profile representing the user's relative interest in each of the plurality of attributes; obtaining, at the client device, at least one geographic preference of the user; determining a relevance for each deal in the collection of deals, wherein the relevance for each deal is based on one or more metrics representing a distance between the values for the plurality of attributes of each deal and the profile; selecting a set of deals from the collection of deals based on the determined relevance; and outputting the selected set of deals to a display of the client device.

The profile of the user can be stored only on the one or more memories of the client device such that privacy of the user's profile is maintained. However, some implementations may involve replicating the profile and/or the user's geographic preferences to another client device of the user such that the replicated profile on the other client device is available for determining the relevance for each deal in the collection of deals at the other client device.

Some implementations may include outputting a map to the display of the client device, and receiving an input from the user identifying a region on the map, wherein the input comprises a gesture of the user. The gesture of the user may be the user dragging a digit or stylus around the region on the map. Alternatively, the gesture of the user may be the user tapping a digit or stylus on a point on the map to identify a selected region of the map having a first area, and then holding the digit or stylus on the point on the map such that the selected region of the map decreases in size to a second area, the second area being smaller than the first area. Or, the gesture of the user may be the user tapping a digit or stylus on a point on the map to identify a selected region of the map having a first area, and then holding the digit or stylus on the point on the map such that the selected region of the map increases in size to a second area, the second area being larger than the first area.

Some implementations may involve receiving an input from the user identifying a geographic location and an associated future time period that the user expects to be at the geographic location.

In some implementations, the client device may render representations of the selected set of deals in a tile pattern on the display, wherein a representation of a first deal from the selected set is rendered in a first tile having a first size, the first size being based on the relevance of the first deal, wherein a representation of a second deal from the selected set is rendered in a second tile having a second size, the second size being based on the relevance of the second deal, and wherein the relevance of the first deal is greater than the relevance of the second deal such that the first size of the first tile is larger than the second size of the second tile.

In some implementations, the client device may render representations of the selected set of deals in a tile pattern on the display, wherein a representation of a first deal from the selected set is rendered in a first tile at a first location in the tile pattern, the first location being based on the relevance of the first deal, wherein a representation of a second deal from the selected set is rendered in a second tile at a second location in the tile pattern, the second location being based on the relevance of the second deal, and wherein the relevance of the first deal is greater than the relevance of the second deal such that the first location of the first tile is above and/or to the left of the second location of the second tile.

Some implementations may involve rendering a representation of a first deal from the selected set in a first tile having a first size; rendering a representation of a second deal from the selected set in a second tile having a second size; receiving a command from the user to cause the display of the client device to zoom out; responsive to determining that a relevance of the first deal is greater than a relevance of the second deal, decreasing the first size of the first tile and the second size of the second tile while increasing the first size of the first tile relative to the second size of the second tile.

In some implementations, the one or more metrics representing the distance between the values for the plurality of attributes of each deal and the profile are determined by performing latent Dirichlet allocation.

The user profile can be obtained by determining that the user has purchased one or more deals, each of the purchased deals having a value for each of the plurality of attributes; and calculating the profile based on the values for each of the purchased deals. Alternatively or in addition, the user profile can be obtained by outputting one or more candidate deals to the display of the client device, each of the candidate deals having a value for each of the plurality of attributes; receiving a selection from the user of one or more of the candidate deals; and calculating the profile based on the values for each of the selected candidate deals.

Some implementations may involve receiving information that one or more of the deals in the collection of deals are sponsored deals, wherein selecting a set of deals from the collection of deals based on the determined relevance comprises selecting the set of deals from the collection of deals based on the determined relevance and the information that one or more of the deals are sponsored deals.

Another aspect of the subject matter described in this specification may include the actions of obtaining a set of deals, each deal being associated with a relevance; determining a visual hierarchy for rendering the set of deals, wherein a rank in the visual hierarchy of a representation of each deal is based on the relevance of the respective deal; and rendering representations of the set of deals in a tile pattern on a display of a client device. In some implementations, a representation of a first deal from the set is rendered in a first tile having a first size, the first size being based on the relevance of the first deal, a representation of a second deal from the set is rendered in a second tile having a second size, the second size being based on the relevance of the second deal, and the relevance of the first deal is greater than the relevance of the second deal such that the first size of the first tile is larger than the second size of the second tile. The actions may further include receiving a command from a user to cause the display of the client device to zoom out; responsive to determining that the relevance of the first deal is greater than the relevance of the second deal, decreasing the first size of the first tile and the second size of the second tile while increasing the first size of the first tile relative to the second size of the second tile.

Other features may include corresponding systems, apparatus, and computer programs, configured to perform the actions of the methods, encoded on computer storage devices.

The details of one or more implementations are set forth in the accompanying drawings and the description, below. Other potential features and advantages of the disclosure will be apparent from the description and drawings, and from the claims.

DESCRIPTION OF DRAWINGS

FIGS. 3A-G are screenshots of a sample mobile application on a client device that receives, filters, and displays deals to a user.

Like reference symbols in the various drawings indicate like elements.

DETAILED DESCRIPTION

Merchants often desire to target deals to specific consumers. These deals can be targeted based on, for example, the consumers' preferences, interests, likes, and dislikes. In some implementations, targeting may involve the creation of a user profile that represents a consumer's interests relating to a variety of categories. Many consumers, while desiring to receive such targeted deals, are nevertheless concerned about maintaining their privacy. Thus, the users may not want such a profile to be stored on a server or other computer that is easily accessible via the Internet. It may therefore be advantageous to create and maintain user profiles in a location, such as a consumer's mobile device, that the consumer can exercise control over.

Systems and methods that may satisfy this need are described below. First, a general description of example implementations will be described. Then, more detailed aspects of exemplary features are described, including screenshots of a sample graphical user interface.

Various implementations relate to a system that provides a collection of deals to a mobile application on a client device. The mobile application then filters the deals based on relevance using a user profile within the client device, and displays the deals to a user. The display of the deals may be governed by the relevance of the respective deals as determined by matching of the deals with the user profile within the client device.

As described herein, a deal is a monetary discount on a product (e.g., food), service (e.g., cleaning services, spas, or transportation), or a group of products and/or services offered for sale by a merchant. Deals may be offered for a set period of time (for example, 24 hours). Deals can also be group-based (in which a plurality of consumers buy the deal) or the deal can be individually tailored to specific types of consumers.

Figure 1:
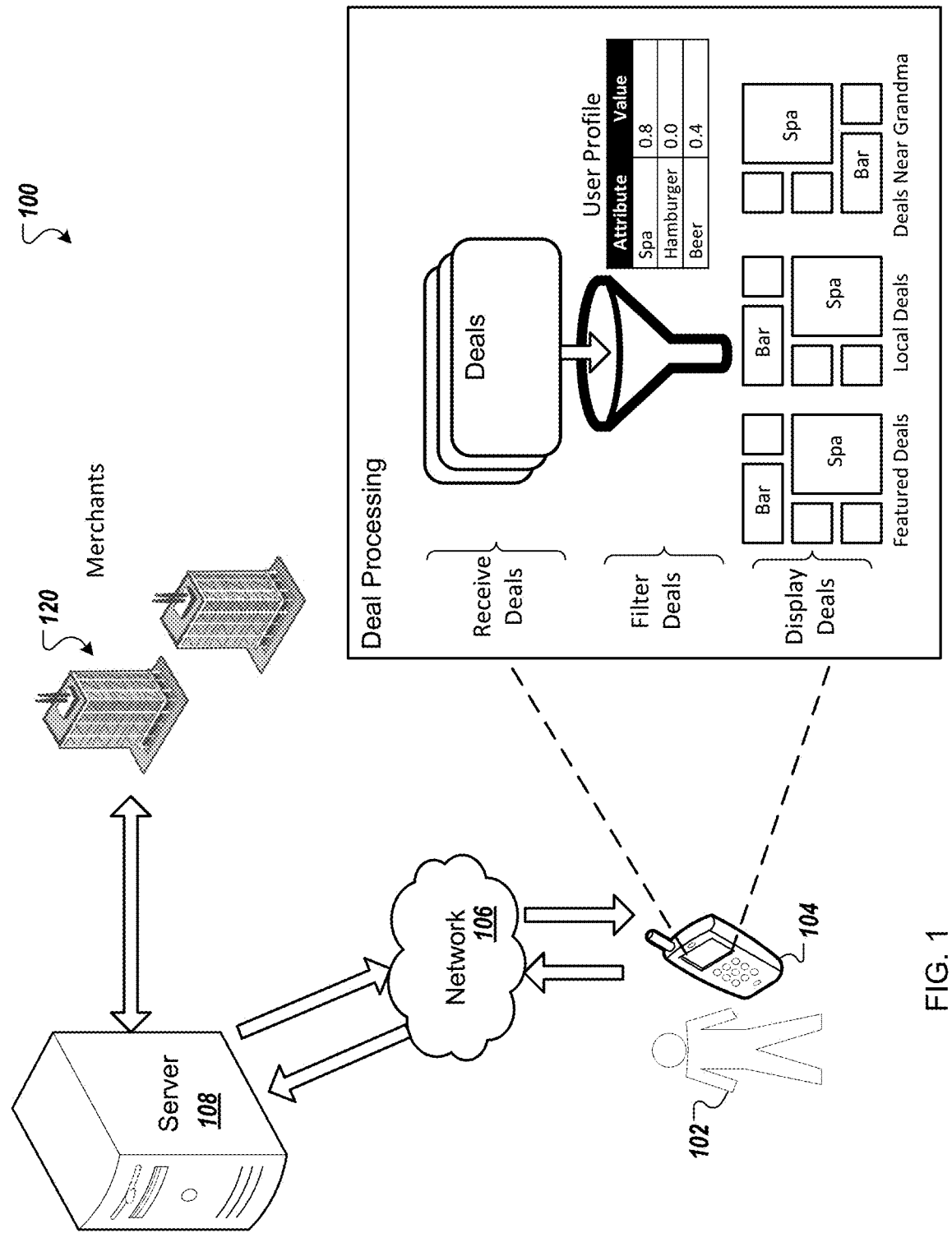
FIG. 1 is a diagram of an example system that provides merchant deals to a mobile application on a client device, which filters and displays the deals.

FIG. 1 shows an example system 100 that provides merchant deals to a mobile application on a client device 104, which filters and displays the deals. The client device 104 is operated by a user 102, who operates the client device to execute a mobile application. The mobile application retrieves deals via a network 106 from a server 108. The server 108 can be operated by a deal brokerage that offers deals on goods and services from various merchants 120.

In operation, the server 108 provides a collection of deals 110 (e.g., a large set of deals) to the client device 104. The server 108 may provide the collection of deals 110 periodically (e.g., hourly, daily, or weekly), and the deals may be pulled by the client device 104 or pushed from the server 108. The mobile application on the client device 104 processes the collection of deals in three steps. First, in step 120, the mobile application receives and stores the deals 110 in a memory. Next, in step 122, the mobile application filters the deals. The filtering can be performed, for example, by scoring each deal based on relevance using a user profile 132, and then selecting the deals having the highest relevance. The user profile 132 can represent an aggregate measure of the user's past deal selection behavior. The user profile 132 may also be generated and/or augmented by surveying the user as discussed in more detail below. Finally, in step 124, the mobile application outputs the most relevant deals to a display of the client device 104. These deals can then be displayed in a set of tile patterns 134a, 134b, 134c.

Each component and entity involved with the system 100 will now be described in more detail.

First, the user 102 is an entity who participates in the buying of deals. The user 102 uses the client device 104 to access deals provided by the server 108 via the network 106.

The client device 104 may be any type of computing device capable of communicating with the server 108 via the network 106, including but not limited to a mobile phone, smart phone, PDA, music player, e-book reader, tablet computer, laptop or desktop computer, or other stationary or portable device, that includes one or more processors and non-transitory computer readable storage media. A mobile application executing on the client device 104 provides an interface through which the user 102 can access deal information and purchase deals. The mobile application can be written in any suitable programming language such as, for example, Objective-C, C++, Java, JavaScript, C#, etc. running on any suitable operating system, e.g., Windows 8, iOS, or Android.

The mobile application on the client device 104 provides an interface for the user to see information about the deal, such as, for example, the location at which the deal can be used, the price of deal, a description of the item or items for sale in the deal, or the time during which deal is offered. The mobile application also provides an interface for the user 102 to purchase deals (described in more detail below), which are represented by deal vouchers. Once the deal is purchased, the user 102 can retain the deal voucher or give the deal voucher to another recipient (for example, by gifting the deal). The user 102 (or the recipient of the deal if the recipient is not the user 102) can use the deal voucher to pay for or discount the corresponding products or services (e.g., purchase a good/service or to receive a discount for a good/service) by visiting the merchants 120 either in person (if the merchant's store is a brick and mortar store) or virtually (for example, if the merchant's store includes an online presence) before the expiration of the deal voucher.

Various types of deal vouchers are contemplated for showing a record of the purchased transaction. For example, the voucher may be in the form of a printable receipt or may be in the form of a receipt viewable through a graphical user interface (GUI) of the client device 104.

To use the deal, the user 102 presents a deal voucher to the merchant 120 and allows the merchant 120 to scan or read the deal voucher to check that it is valid (i.e., not expired and not fraudulent). For example, the user 102 can print the deal voucher and take it to the merchant's store. As another example, the user 102 can let the merchant 120 electronically scan a code that is unique to the deal voucher and is displayed on the client device 104 of the user 102. The user 102 (or recipient) can use the deal voucher at any time before the expiration of the deal voucher.

The network 106 can include one or more networks such as the Internet. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a Bluetooth, WiFi, or other such transceiver.

The server 108 transmits collections of deals to the mobile application on the client device 104. The server 108 includes a programmable machine that is able to respond to instructions in a well-defined manner and can execute instructions (such as found in a program or engine). The server 108 includes electronic and digital components, including hardware needed to implement the instructions and read/access data. The server 108 includes a communication mechanism that is able to communicate with the network 106.

In particular, the server 108 may include application server software that communicates with client devices 104. For example, the server 108 may include web services (e.g., Representational State Transfer (REST) or Simple Object Access Protocol (SOAP) services) or push services configured to provide data on deals to the client devices 104. The application server may be, for example, a Java EE server, a Ruby on Rails server, or a Microsoft Internet Information Services (IIS) server.

The server 108 aggregates deals from the merchants 120, and periodically provides collections of deals that are currently available for purchase to the client device 104. The server 108 can communicate with the merchants 120 to obtain the deals via any suitable technique such as via a web portal, e-mail, or SMS.

The server 108 may be operated by a deal brokerage. The deal brokerage creates deals, with the help and feedback of the merchants 120, offers deals, for example, via transmitting data representing the deals to client devices 104 or offering deals on a deal website, and manages the deals using the server 108. The deal brokerage does not necessarily maintain an inventory of goods or services. Rather, the merchants 120 maintain the inventory, for example, at a merchant store or at a location such as a warehouse that may be distinct from the merchant store. The merchant store can be a brick and mortar store physically located near to the user 102 or to someone else who will be receiving the deal obtained by the user 102. The store can alternatively or additionally include a virtual (that is, online) store accessible through a network.

Each deal in the collection of deals 110 may include a variety of information. In some implementations, each deal may include an identifier of the deal (e.g., a unique identification number for the deal) that will allow the client device 104 to request additional information on the deal. In other implementations, each deal may include more complete information on the deal such as for example, a URL to an image of the deal, deal statistics, a merchant name, deal name, a deal description, the location of the deal, and any other suitable information. The deal information may also include real time statistics describing how many of the deals have been purchased in aggregate across the consumer base. In addition, each deal includes a value for each of a variety of attributes. The attributes may be, for example, ontological categories suitable for identifying areas of interests to the user 102. Sample categorizations may be, for example, beer, sushi, hamburgers, spas, or any other suitable category.

The values associated with each of the attributes may be normalized values between 0.0 and 1.0 or may be rated on any other suitable scale. These values can be compared against the user profile 132 to generate a relevance score for each deal. FIG. 1 illustrates the attribute/value pairs for an exemplary user profile 132. As an example, the user profile 132 includes attributes for beer, hamburgers, nightlife, and spas, and the associated values of 0.8, 0.0, 0.85, and 0.95 respectively. Any suitable technique can be used for evaluating the relevance of each deal based on the deal's attribute values, for example, latent Dirichlet allocation (LDA), or hidden Markov models (HMM). Advantageously the user profile 132 may be stored only on the user 102's client device 104, thereby maintaining the user's privacy. In some implementations, the user profile 132 may also be replicated to other client devices associated with the user 102, for example over the network 106.

The collection of deals 110 may be stored in any suitable data structure, for example, a JavaScript object notation (JSON) data structure, or an extensible markup language (XML) data structure. The collection of deals 110 may also be compressed using any suitable compression algorithm such as, for example, GZIP, or deflate.

The merchants 120 are business entities that have goods and/or services to sell that are of interest to a user 102. The merchants 120 can maintain inventories of goods, and can house at least some of the inventory in a brick and mortar store. The merchants 120 may have a business relationship with the deal brokerage for the procurement and provision of deals to consumers.

The deal processing performed in the client device 104 will now be described in more detail. In initial step 120, the client device receives a collection of deals 110 from the server 108 via the network 106. The client device 104 then parses the deal data using a suitable parser corresponding to the data structure of the collection of deals 110, and stores the deals in any suitable memory on the client device 104. In cases where the collection of deals 110 is compressed, the client device 104 will also perform decompression.

In step 122, the client device 104 filters the deals 110 by ranking the deals against the user profile 132, and selecting the most relevant deals for display to the user. The filtering, as discussed above, may be performed using any suitable technique such as LDA or HMM to obtain scores for each of the deals. For example, in some implementations using LDA, whenever a user 102 selects a specific deal (e.g., a spa deal), that selection becomes a representative deal of the user. The sum total of the user's representative deals can then be used to determine an LDA score against subsequent deals. In particular, LDA creates an abstract categorization (e.g., array of float values representing the user profile 132) that is used to compare against another array (e.g., deals) to determine distance.

In addition to scoring the deals based on relevance to the user profile 132, a location filter may also be applied. For example, the user 102 may be able to enter location preferences via a graphical user interface on the client device 104, and these location preferences can be used to further filter the deals. In some cases, deals may be sponsored by certain merchants so that they are weighted more heavily than unsponsored deals. Then, the deals are ranked according to their respective scores, and the highest scoring deals are selected. In exemplary implementations, the threshold for selection may be, for example, the top 5 deals, the top 10 deals, the top 15 deals, or the top 20 deals.

The selected deals are then displayed to the user 102 and step 124. Sample displays of the deals are illustrated in FIG. 3A to 3G. The selected deals can be displayed in tile patterns, for example the tile patterns 134a, 134b, 134c. The client device 104 may order deals in the visual hierarchy of the tile patterns (described below) based on the relevance of the deals. Thus, more relevant deals may be rendered in higher levels in the visual hierarchy, and less relevant deals may be rendered in lower levels of the visual hierarchy. For example, the most relevant deals may be rendered in the first tile pattern 134a annotated as Featured Deals. Moreover, the most relevant deal may be rendered in a larger block $134a_1$, to signify its high relevance score to the user 102. The next most relevant deals may be rendered in the second tile pattern 134b annotated as Local Deals, signifying that the deals are less relevant than the deals rendered in the first tile pattern 134a, but are still relevant to the user 102. The third tile pattern 134c includes deals that are relevant to the user 102, and are determined to be near the user 102's anticipated location in the future, in this example, the user's grandmother's house.

As described herein, visual hierarchy is the order of importance of elements in a visual design. Visual hierarchy is based on the idea that certain features of elements draw the eye to certain locations of an image or document. These features can include size, location, color, contrast, alignment, repetition, proximity, density, and texture. For example, larger elements rank more highly in the visual hierarchy than smaller elements. For English speakers, elements located in the top left rank the most highly in the visual hierarchy because English is read from left to right and top to bottom. Bold and intense colors promote elements more highly in the visual hierarchy. High contrast (e.g., dramatic shifts in text-size, font, or color) can promote elements to higher ranks within the visual hierarchy. When elements are arranged in symmetric patterns (e.g., a grid pattern), elements that break the pattern will rank highly in the visual hierarchy. For example, for a 3×3 tile pattern of identically sized square tiles, if 8 of the 9 tiles were oriented within a grid, but one tile was rotated 45 degrees, the rotated tile would rank highly in the visual hierarchy.

When the client device 104 renders the selected deals in tile patterns, the order of deals in the visual hierarchy of the tile patterns may be based on the relative relevance of the selected deals. For example, the client device can render the most relevant deal with one or more features that promote it to the highest position in the visual hierarchy, such as, for example, the largest size, the top left position in the tile pattern, a bold color background and/or border, high contrast with other deals (e.g., a different font or text size), and or a different alignment (e.g., a 45 degree rotation) from the other tiles. Furthermore, the client device 104 may automatically rank order the deals from highest to lowest in the visual hierarchy based on their relative relevance. Thus, if the most relevant deal is the largest and in the top left location, the second most relevant deal may be larger than all the deals except the most relevant deal and/or in the top row immediately to the right of the most relevant deal.

Figure 2:
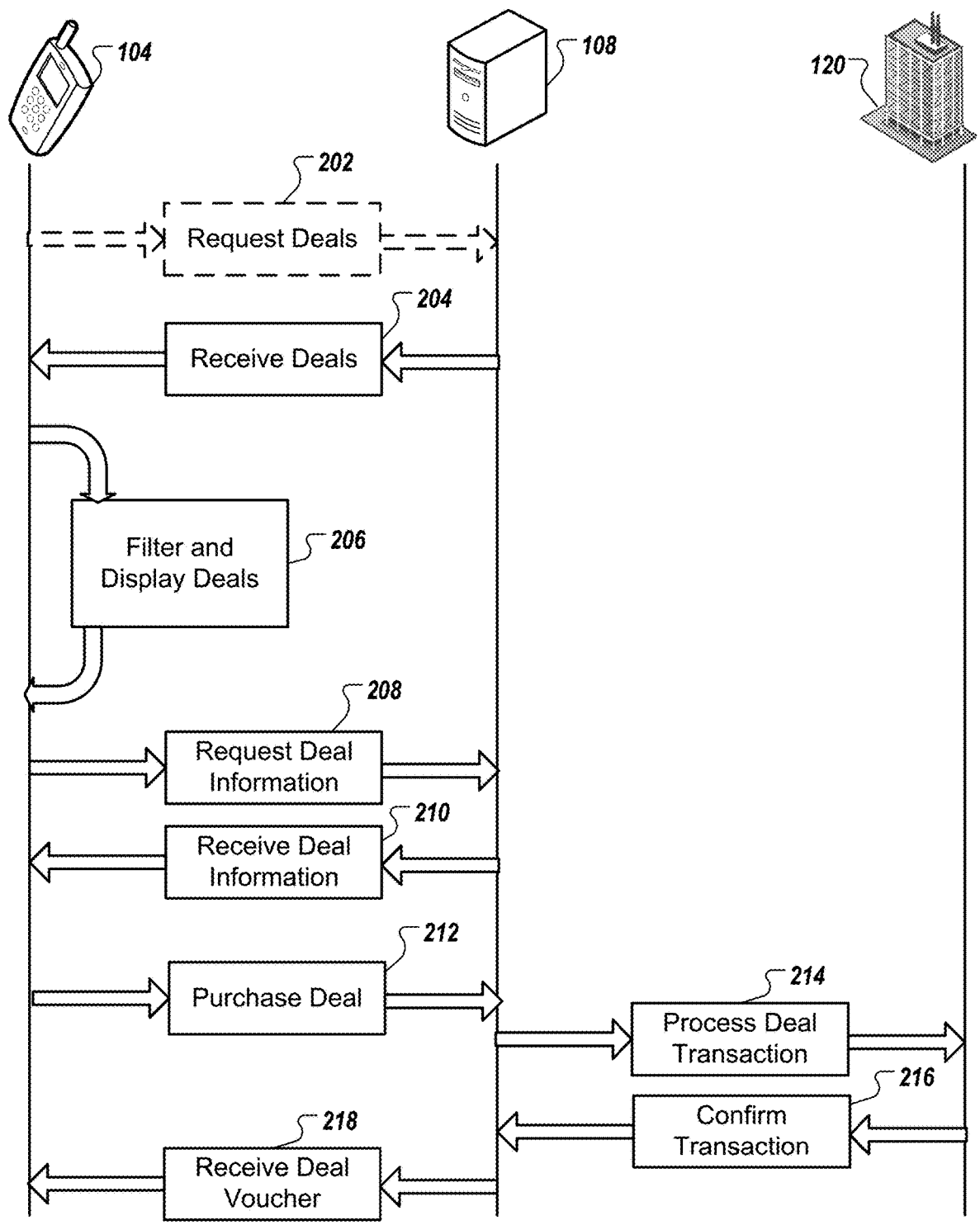
FIG. 2 is a messaging diagram that illustrates sample messages between a client device, server, and merchants in a system that provides merchant deals to a mobile application on a client device.

FIG. 2 illustrates sample messages between a client device 104, a server 108, and merchants 120, in a system 100 that provides merchant deals to a mobile application on a client device. Initially, in optional message 202, the client device 104 may request deals from the server 108. As discussed above, this request message 202 is optional because the server 108 may utilize push technology to transmit deals on a periodic basis to the client device 104. The server 108 then periodically transmits a message 204 to the client device 104 that includes the collection of deals 110. The periodicity of the message 204 may be, for example, hourly, daily, weekly, or any other suitable time period.

The client device 104 then filters and displays the deals in step 206 as discussed above. When the user 102 selects a deal, the client device 104 may send a request for more detailed deal information message 208 to the server 108. The request deal information message 208 may include an identifier of the selected deal. In response, the server 108 transmits a received deal information message 210 back to the client device 104 that includes the deal information requested by the client device 104. In some implementations where the collection of deals 110 includes more complete information on each deal, the request deal information message 208 and the received deal information message 210 may not be required.

When the user 102 decides to purchase a deal, by, for example selecting a purchase deal option on a graphical user interface of the client device 104, the client device 104 transmits a purchase deal request message 212 to the server 108. In some implementations, the server 108 may coordinate with the merchants 120 to process a deal transaction by transmitting a message 214 to the merchants 120. Upon confirming the transaction the merchant 120 responds to the server 108 by sending a message 216. In other implementations, each deal may be associated with a predetermined maximum number of instances the server 108 is authorized to sell, i.e., the server 108 monitors how many instances of a given deal have been sold and will not authorize any additional purchases of the deal when the maximum number is reached. In such implementations, the server 108 need not transmit the process deal transaction message 214 to the merchants 120 or receive the transaction confirmation message 216.

The server 108 then generates and transmits a receive deal voucher message 218 to the client device 104. The received deal voucher message 218 includes electronic voucher representing the deal that the user 102 may present to the merchant 120.

Figure 3A:
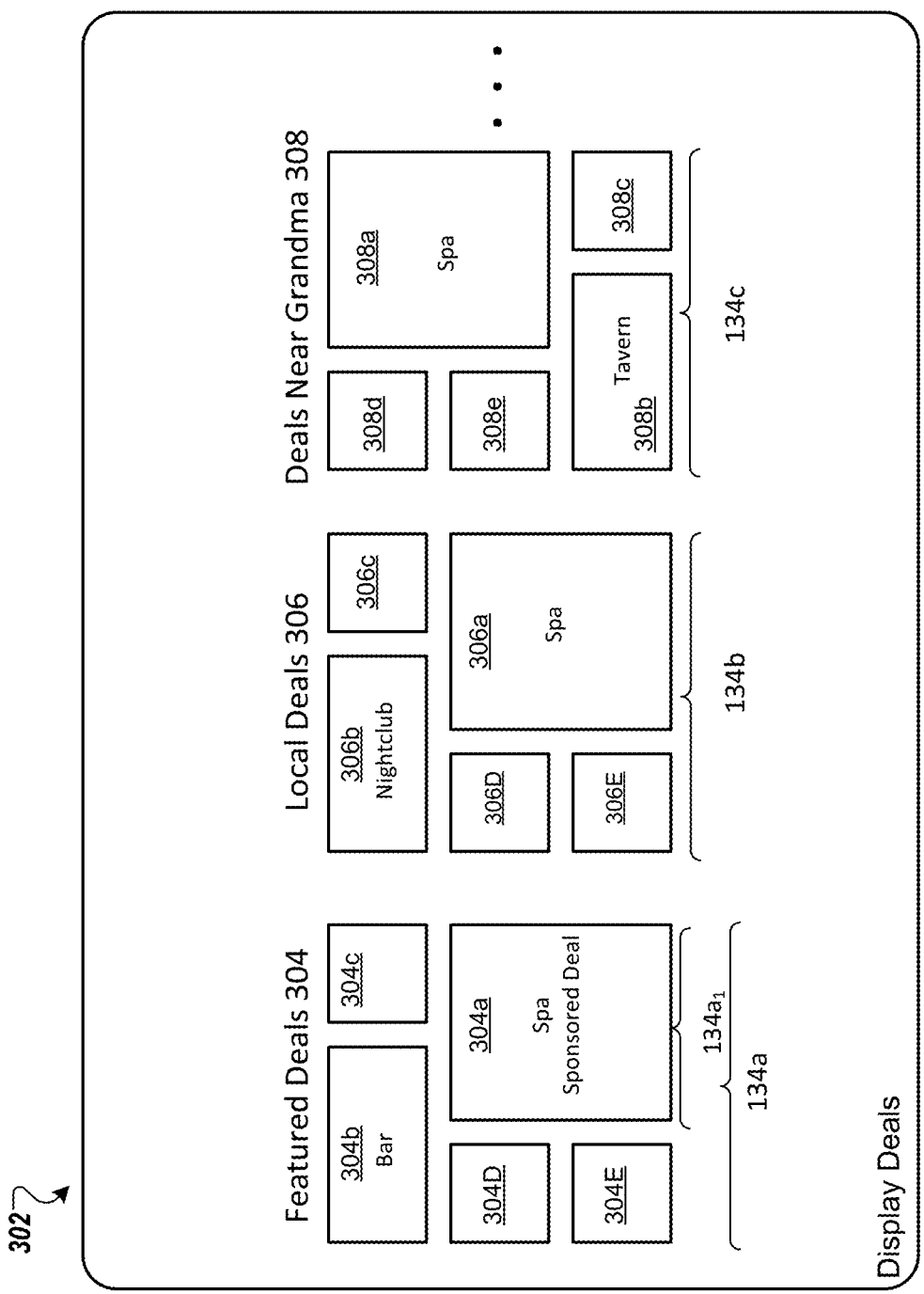

FIGS. 3A to 3G show sample screenshots of a mobile application on the client device 104 that receives, filters, and displays deals to the user 102. FIG. 3A shows a sample view 302 of the client device 104 that includes three sets of deals, Featured Deals 304, Local Deals 306, and Deals Near Grandma 308.

In this sample, the user 102 may have indicated a preference for spas, beer, and nightlife. The user's preferences may not necessarily be explicitly stated preferences from the user (e.g., the user stating that they like spas, beer, and nightlife), but rather may be inferred preferences. In particular, the application may infer from a user's past behavior (e.g., the user selecting deals relating to spas, beer, and nightlife at a relatively high frequency) that the user prefers deals categorized as relating to spas, beer, and nightlife. For example, the user profile 132 may include a very high value (for example 0.95) for the attribute corresponding to spas, and high values for the attributes corresponding to beer and nightlife (for example 0.8 and 0.85 respectively). As a result, the Featured Deals 304 include a spa deal in the largest tile 304a in a prominent location (the bottom right position). Additionally, the spa deal associated with tile 304a is a sponsored deal, which means that the deal broker has designated this deal to be associated with extra weight. The extra weight associated with the spa deal may be added in the filtering step 122 shown in FIG. 1. Consistent with the user 102's preferences for beer and nightlife, a deal for a bar is rendered in tile 304b. The tile 304b is also a larger tile and in a more prominent location (the top left) then the remaining tiles 304c, 304D, 304E.

The deals in the first set of deals 304 typically correspond to deals near the most likely geographic location of the user 102 as indicated by the user's geographic preferences. As described in more detail below, the user 102 may be able to select the local market (for example, a user's home location) as well as other locations that the user is interested in (for example, a user's office) or that the user may be visiting in the future. Featured Deals 304 may also include featured travel destinations that are not location specific.

Similarly, the Local Deals 306 include a spa deal in the largest tile 306a in a prominent location (the bottom right position), and a deal for a nightclub is rendered in tile 306b. The tiles 306a and 306b are larger and in more prominent locations than the remaining tiles 306c, 306D, 306E. The deals in the second set of deals 306 typically correspond to the most relevant deals in a user's selected local market. The user 102's selected local geographic location may not necessarily be the same as the user's most likely geographic location associated with the Featured Deals 304. For example, if the user 102 has indicated that they are planning to make a trip to a location outside of their selected local market, the Featured Deals 304 may include deals at the destination of the trip rather than the user's selected local market if the client device 104 determines that the user 102 is more likely at the destination.

Finally, the Deals Near Grandma 308 include a spa deal in the largest tile 308a in a prominent location (the top right position), and a deal for a tavern is rendered in tile 308b. The tiles 308a and 308b are larger and in more prominent locations than the remaining tiles 308c, 308d, 308e. The deals in the third set of deals 308 may correspond to the most relevant deals in a destination that the user 102 has indicated they anticipate visiting.

Figure 3B:
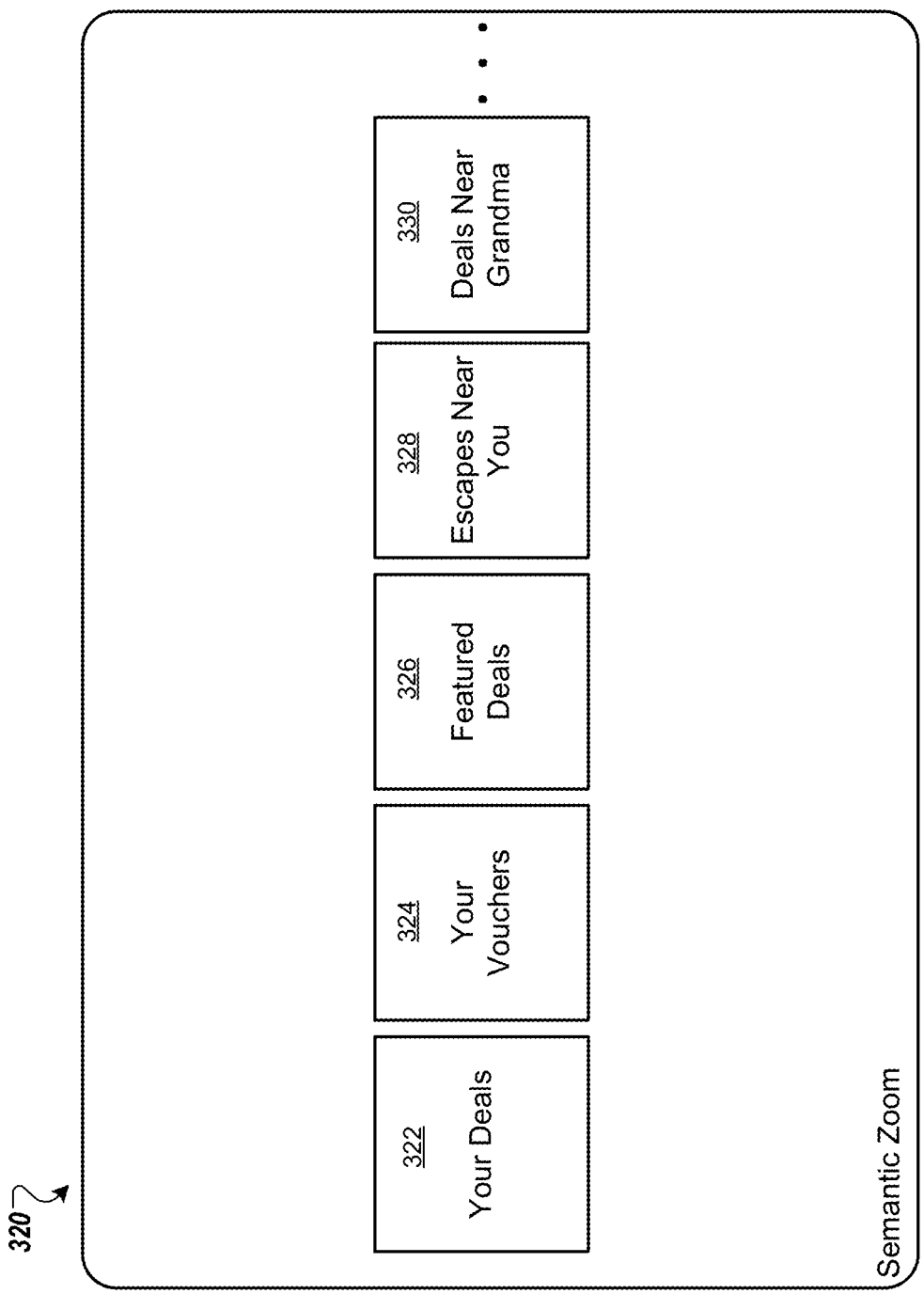

FIG. 3B illustrates a screenshot of a semantic zoom feature. Such a feature can be activated, for example, when the user makes a pinch and zoom gesture on the graphical user interface of the client device 104. The semantic zoom feature causes the user interface to zoom out and display more information than was displayed previously. For example, if the user zoomed out on the view 302 of FIG. 3A, the user would see view 320, which includes blocks 322, 324, 326, 328, and 330. As shown, block 322 shows Your Deals (e.g., deals for the user 102), block 324 shows Your Vouchers (e.g., vouchers for deals owned by the user 102), block 326 shows Featured Deals (e.g., the set of tiles 304 discussed above) (also referred to herein as Deals Near You), block 328 shows Escapes Near You (e.g., featured travel destinations), and block 330 shows Deals Near Grandma (e.g., the set of tiles 308 discussed above).

When the semantic zoom feature is activated, the most relevant deals may become larger relative to less relevant deals in each of the blocks 326, 328, and 330. For example, in the Featured Deals block 326 the spa deal tile 304a may consume 75% of the tile, with the remaining 25% being filled with the nightclub deal tile 304b. Thus, while the spa deal tile 304a decreases in absolute size, it increases in size relative to the nightclub deal tile 304b. This occurs because the spa deal tile 304b corresponds to a highly relevant deal while the nightclub deal tile 304b corresponds to a less relevant deal.

The semantic zoom feature may apply thresholds to determine which deals should receive what percentage of the tile upon zooming out. For example, any single deal having a relevance greater than 90% may be rendered in 100% of the tile upon zooming out. If no single deal has a relevance greater than 90%, then the top two deals may be rendered with the most relevant deal being rendered in 75% of the tile and the remaining 25% being filled by the second most relevant deal. It will be appreciated that any other suitable thresholds for displaying deals based on relevance upon zooming out can be used.

Figure 3C:
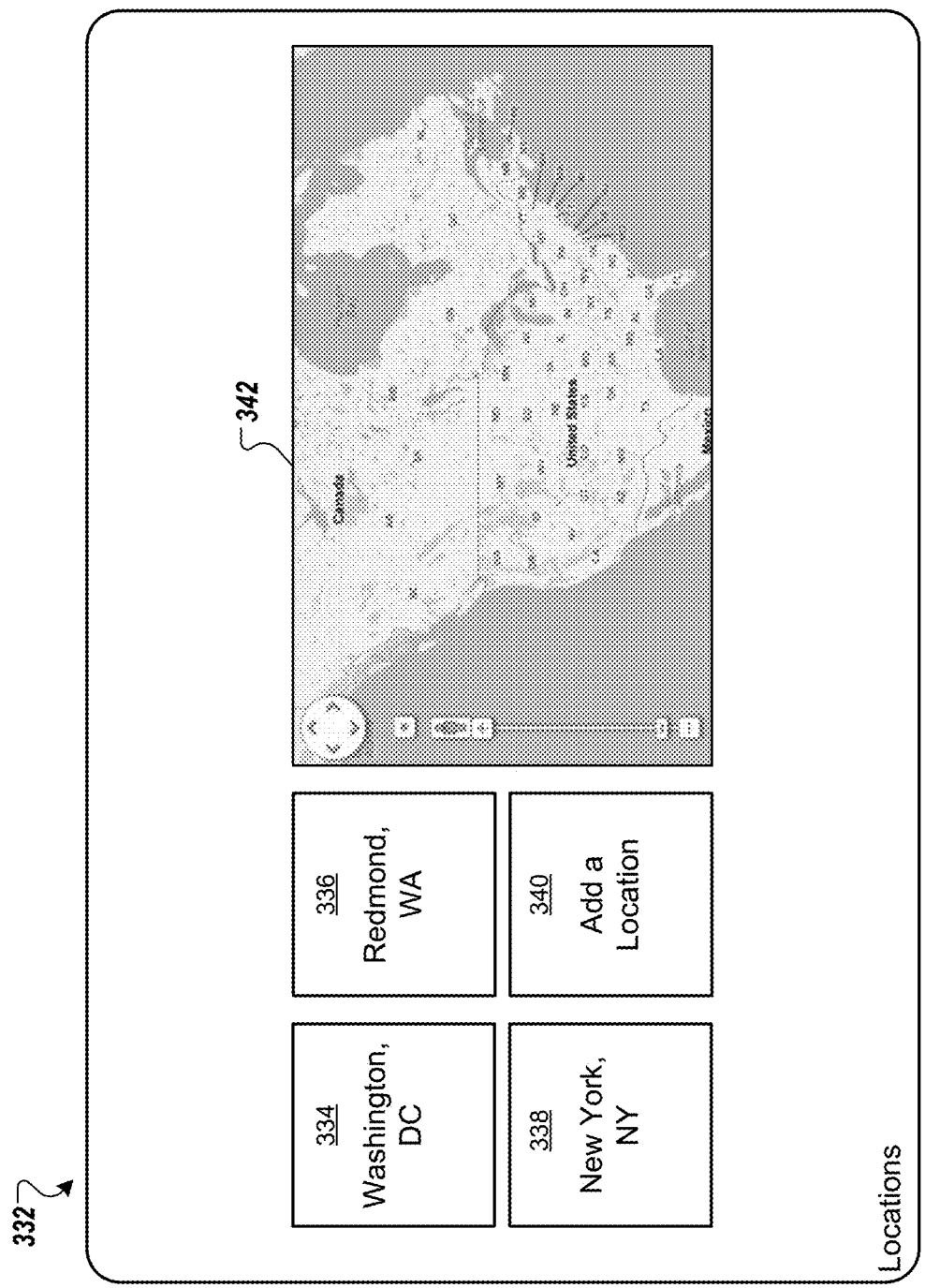

FIG. 3C shows a sample view 332 that allows a user 102 to enter geographic preferences. These geographic preferences may be used for filtering the collection of deals as described above. For example, the user 102 may select a local market, and one or more other locations that the user is interested in. The view 332 includes a block 334 indicating that the user has selected Washington, D.C., a block 336 indicating that the user has selected Redmond, Wash., a block 338 indicating that the user has selected New York, N.Y., and an Add a Location block 340 that allows a user to add a location that is not already included.

When the user 102 selects the Add a Location block 340, the user may identify the location using the graphical map 342. For example, the user may input a gesture identifying a region on the map, where the gesture may include the user dragging a digit or stylus around the desired region of the map. In other implementations, the user may identify a region of the map by tapping a digit (e.g., a finger) or stylus on a point on the map to identify a selected region of the map. This first selected region of the map may be a circle or polygon having an initial large area. To expand the selected region, the user may then hold or tap the digit or stylus on the point on the map which may cause the selected region of the map to decrease in size to a smaller area. Alternatively, the first selected region of the map may be a circle or polygon having an initial small area. To increase the selected region, the user may then hold or tap the digit or stylus on the point on the map which may cause the selected region of the map to increase in size to a larger area.

Figure 3D:
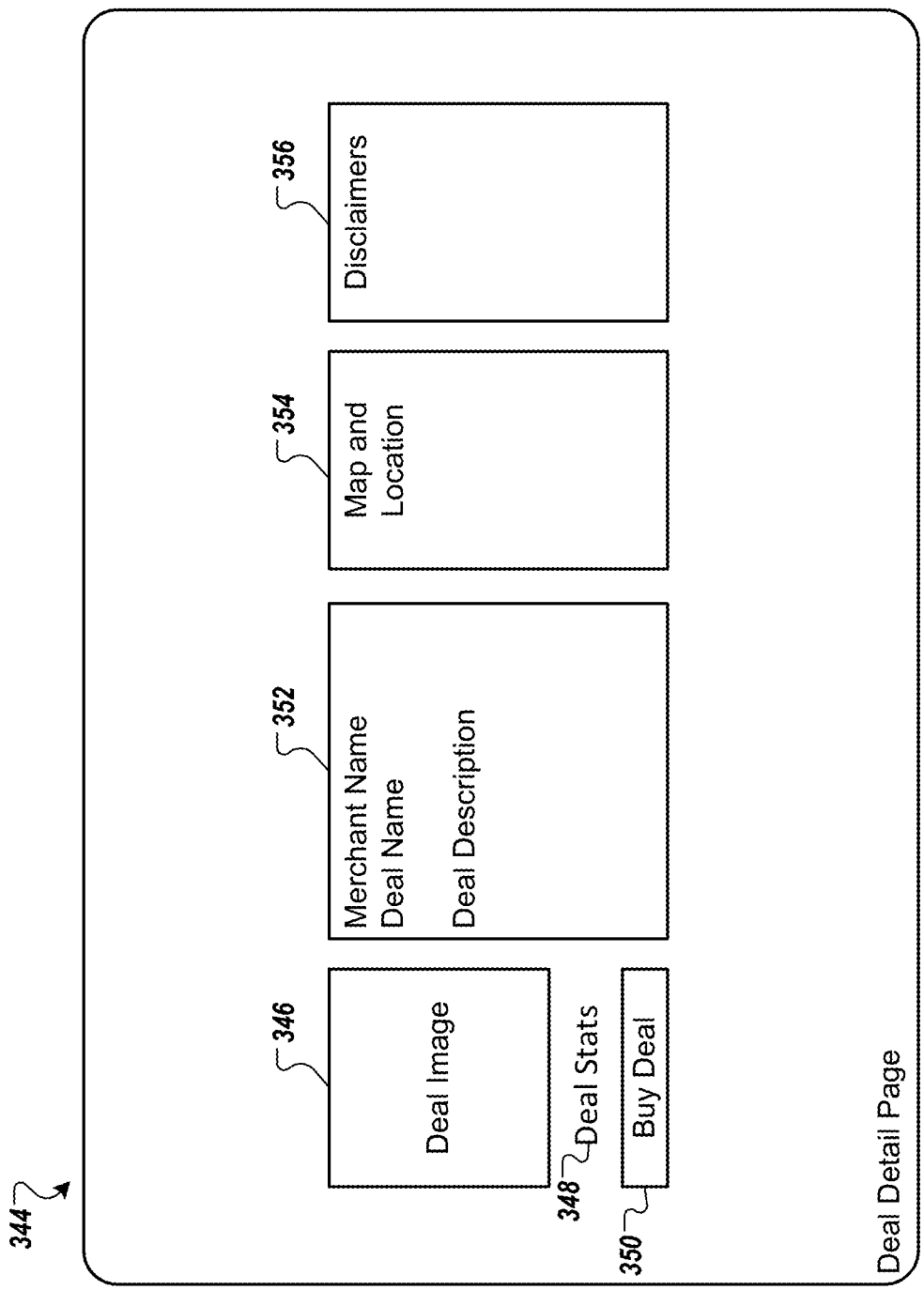

FIG. 3D shows a view 344 that allows a user 102 to browse additional details on a selected deal. In particular, block 346 shows an image of the deal; block 348 illustrates statistics on the deal; block 352 shows a merchant name, deal name, and a description of the deal; and block 354 shows the location of the deal (e.g., where the deal may be redeemed). Block 356 may include legal disclaimers, or any other information. A command button 350 allows the user 102 to purchase a deal.

FIG. 3E shows a view 358 illustrating a confirmation page for a user's purchase of a deal. In particular, block 360 shows an image of the deal; block 362 shows purchase information for the deal; block 366 shows options associated with the deal (e.g., dietary preferences for a meal, number of beds for a hotel room, etc.); and block 368 shows purchase data for the deal. The command block 370 permits a user to add additional payment methods, and a command block 364 allows the user to confirm the purchase.

Figure 3F:
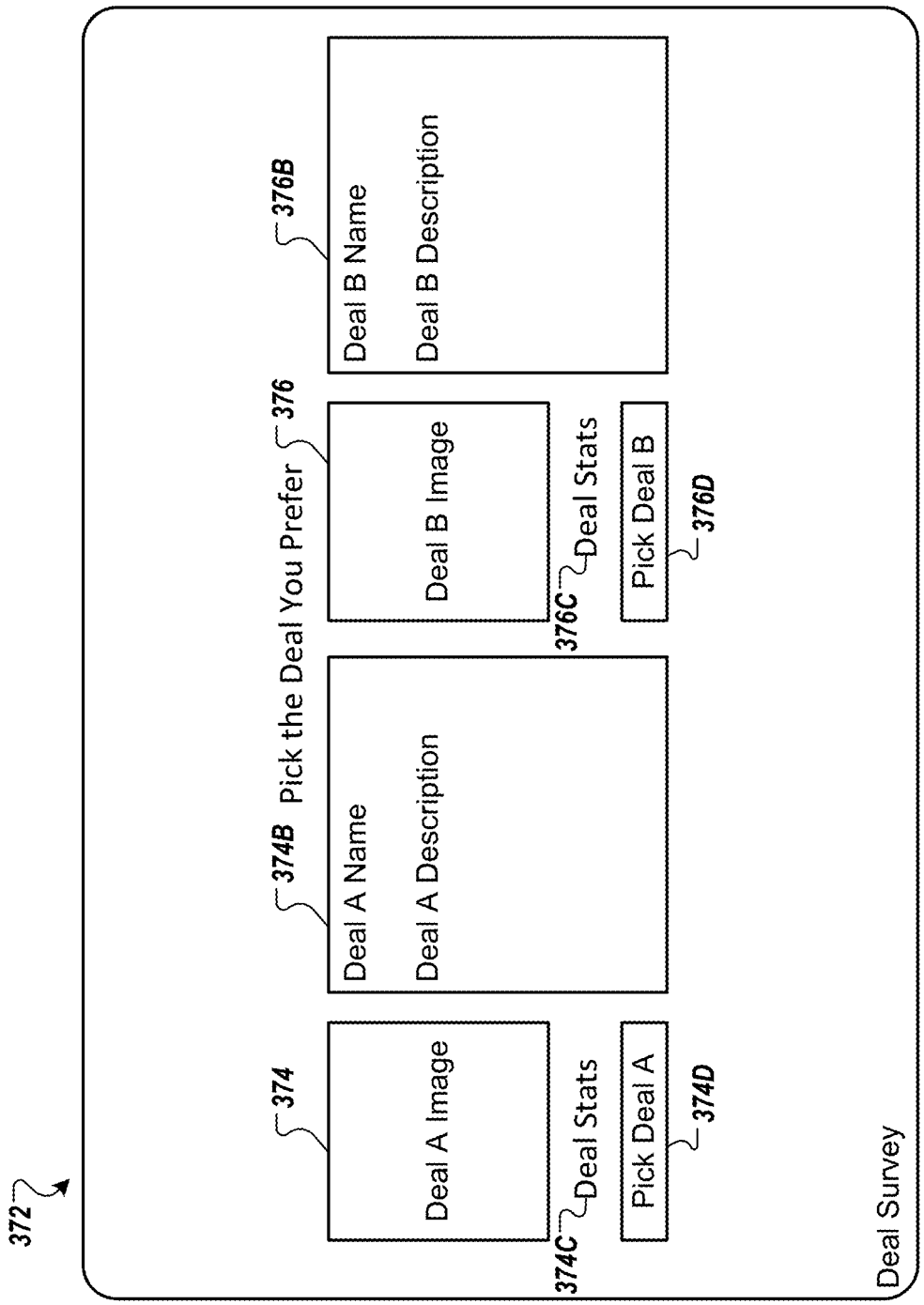

FIG. 3F shows a sample view 372 that allows a user 102 to train their associated user profile 132. For example, because a user profile 132 includes information identifying preferences of the user, the mobile application may train the user profile 132 by allowing a user to decide between a series of different deals so that the user's preferences can be derived. Alternatively or in addition, the mobile application may monitor the user's purchases over time to train the user profile 132.

The view 372 presents the user with a choice between two deals: Deal A 374, and Deal B 376. Deal A 374 may represent, for example, a deal on a spa, and Deal B 376 may represent, for example a deal on hamburgers at a restaurant. Deal A 374 includes an image of the deal A, a deal name and description 374B, deal statistics 374C, and a command button 374D that allows the user to select Deal A. Likewise, Deal B 376 includes an image of the deal B, a deal name and description 376B, deal statistics 376C, and a command button 376D that allows the user to select Deal B. In this case, the user 102 may be a vegetarian, and may therefore have no interest in deals on hamburgers, but the user may be very interested in any deals relating to spas. Accordingly the user 102 may always select deals relating to spas over any other deal. Thus the value relating to the spa attribute in the user profile 132 may be very high (e.g., 0.95). The mobile application may present a series of similar views to determine the user's preferences on a number of attributes.

Figure 3G:
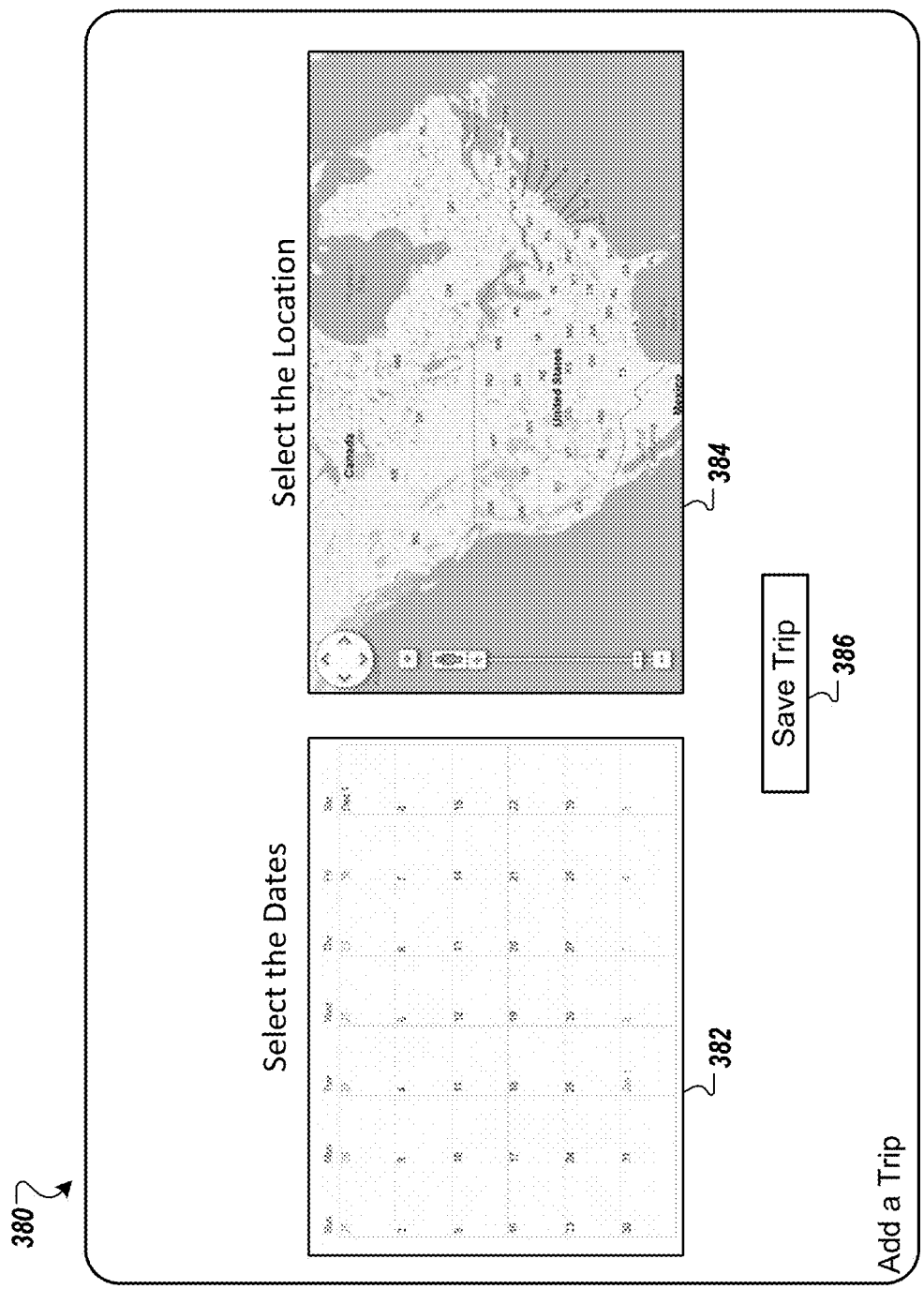

FIG. 3G shows a view 380 that permits a user to enter locations and dates associated with future trips. The mobile application may track such future trips, and include the destinations of these trips in the determination of relevance for filtering the deals. The user may enter the dates by, for example, selecting dates on a graphical calendar 382 using a graphical user interface. The user may also select the location for the trip using a graphical map 384, for example, by using the same gestures described above. When the trip dates and location have been entered, the user may save the trip using the Save Trip command button 386.

Figure 4:
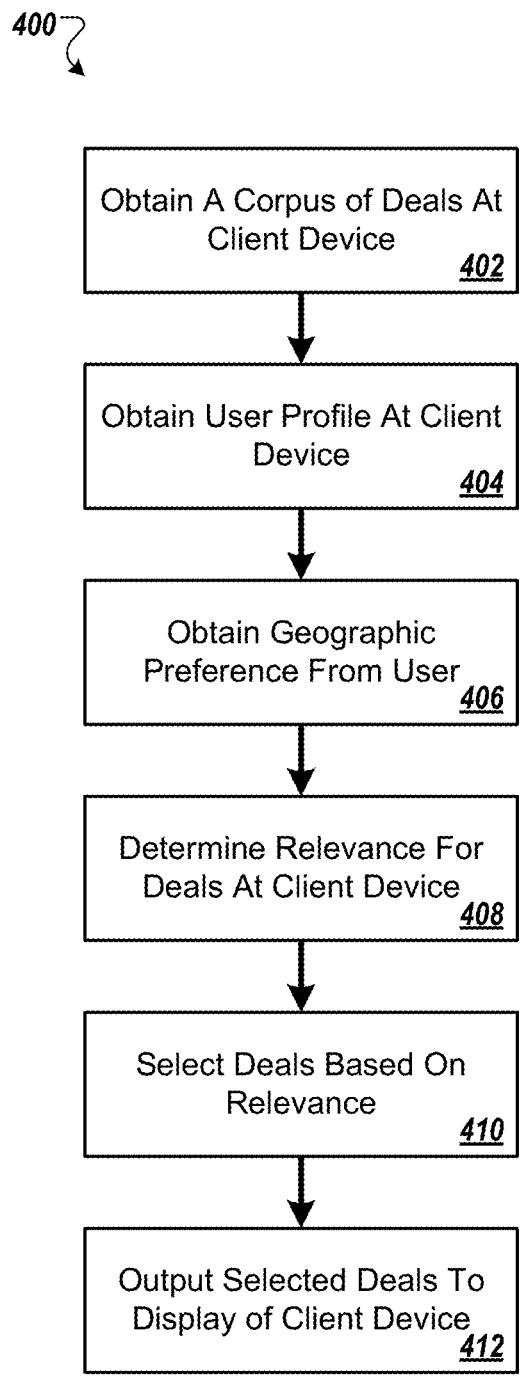
FIG. 4 is a flowchart of an example system that provides merchant deals to a mobile application on a client device, which filters and displays the deals.

FIG. 4 shows a sample process 400 that provides merchant deals to a mobile application on a client device, which filters and displays the deals. Initially, in step 402, the client device 104 obtains a collection of deals 110. For example, the client device 104 may send a request message to the server 108. The server 108 may then transmit the collection of deals to the client device 104. Alternatively, the server 108 may push the collection of deals 110 to the client device 104 at periodic intervals (e.g., hourly, daily, or weekly). Each deal in the collection of deals 110 includes a value for each of a plurality of attributes.

Next, in step 404, the client device 104 obtains a profile of a user 102, where the profile represents the user's relative interest in each of the plurality of attributes. For example, the user profile may include attribute/value pairs. Each attribute may correspond to an interest of the user such as, for example, spas, beer, nightlife, and hamburgers, and each value represents the user's relative interest in that attribute (e.g., a value between 0.0 and 1.0). The client device 104 may obtain the user profile, for example, by retrieving the profile from a memory of the client device.

In some implementations, the client device 104 obtains the user profile by monitoring purchases of the user over time. For example, the client device may determine that the user has purchased one or more deals, and then calculate or update the profile based on the values associated with the attributes of each of the purchased deals. Alternatively or in addition, the client device may train the user profile by surveying the user. For example, the client device may output one or more candidate deals to the display, where each of the candidate deals includes a value for each of a plurality of attributes. The client device then receives a selection from the user of one or more of the candidate deals and calculates or updates the profile based on the values associated with the attributes for each of the selected candidate deals. For training purposes, the client device may present the user with a series of candidate deals to rank the values for a variety of attributes. Advantageously, both techniques for updating the user profile 132 permit the user to maintain control of their data on their client device 104.

The mobile application may also provide the capability for sponsored deals. In such cases, the client device may receive information that one or more of the deals in the collection are sponsored deals. Selecting the deals from the collection of deals 110 may then include ranking deals based on sponsorship information in addition to relevance to the user and location.

In step 406, the client device obtains one or more geographic preferences of the user 102. For example, a mobile application on the client device may output a graphical map to a display of the client device. The client device receives input from the user identifying one or more regions on the map. The input may be a gesture of the user such as, for example, the user dragging a digit or stylus around the desired region on the map. In other implementations, the gesture may be, for example, the user tapping a digit or stylus on a point on the map to identify a selected region of the map with the first area, and then holding the digit or stylus on the point on the map so that the selected region of the map decreases in size to a second area that is smaller than the first area. Furthermore, the client device may also receive an input from the user identifying a geographic location and an associated future time period that the user expects to be at the geographic location (e.g., an anticipated trip).

In step 408, the client device 104 determines a relevance for each deal in the collection of deals 110. The relevance for each deal is based on one or more metrics representing a distance between the values for the plurality of attributes of each deal and the user profile. The client device may calculate the metrics using, for example, LDA or HMM. The relevance of each deal may be represented by a normalized value between 0.0 and 1.0.

Then, in step 410, the client device selects a set of deals from the collection of deals 110 based on the determined relevance. For example, the client device may select the top five deals, the top 10 deals, the top 15 deals, where the top 20 deals based on relevance.

Finally, the client device 104 outputs the selected set of deals to a display of the client device. In some implementations, the client device may render representations of the selected set of deals in a tile pattern on the display. The tile pattern may include, for example, a set of square tiles of varying sizes that fit together to form a larger square. The set of square tiles may include, for example, five tiles: one large tile, one medium tile, and three small tiles. It will be appreciated that any other suitable arrangements and/or shapes of tiles could be used.

When the client device 104 renders the selected deals in tile patterns, the order of deals in the visual hierarchy of the tile patterns may be based on the relative relevance of the selected deals. For example, a representation of a first deal from the selected set can be rendered in a first tile having a first size, where the first size is based on the relevance of the first deal. The tile pattern may also include a representation of a second deal from the selected set that is rendered in a second tile having a second size, where the second size is based on the relevance of the second deal. In a case where the relevance of the first deal is greater than the relevance of the second deal, the size of the first tile is larger than the size of the second tile. In other words, the size of each of the tiles is dependent on the relative relevance of the associated deal. Alternatively or in addition, the arrangement of the tiles in the tile pattern may depend on the relative relevance of the associated deal. For example, where the relevance of the first deal is greater than the relevance of the second deal, the location of the first tile is above and/or to the left of the location of the second tile. In some implementations however, the more relevant deals may be located on the bottom right of the tile pattern. Alternatively, or in addition, the first tile may have one or more other features that cause it to have a higher rank in the visual hierarchy than the second tile such as, for example, a bold color background and/or border, high contrast with other deals (e.g., a different font or text size), and or a different alignment (e.g., a 45 degree rotation) from the other tiles.

In some implementations, the mobile application on the client device may include a semantic zoom feature. Prior to receiving the user's input to invoke the semantic zoom feature, the mobile application renders a representation of the first deal from the selected set in a first tile having a first size, and a representation of the second deal from the selected set in a second tile having a second size. Upon receiving a command from the user to cause the display of the client device to zoom out, the mobile application makes a relevance determination for the deals currently displayed. In response to determining that a relevance of the first deal is greater than a relevance of the second deal, the mobile application decreases the absolute size of the first tile and the absolute size of the second tile (e.g., to zoom out) while simultaneously increasing the first size of the first tile relative to the second size of the second tile.

In some implementations, the profile of the user 102 is stored only on the memories of the client device 104 such that privacy of the user's profile is maintained. The user's profile, however, may be replicated to another client device of the user (e.g., owned or controlled by) such that the replicated profile on the other client device is available for determining relevance of deals on the other client device. In addition, the user's geographic preferences may be replicated to another client device of the user such that the replicated geographic preferences on the other client device are available for filtering deals on the other client device.

While the steps of the process 400 are described above as occurring in a specific sequence, it should be appreciated that the steps may be performed in any suitable order. In particular, the order of steps 402, 404, and 406 may be readily interchangeable.

Figure 5:
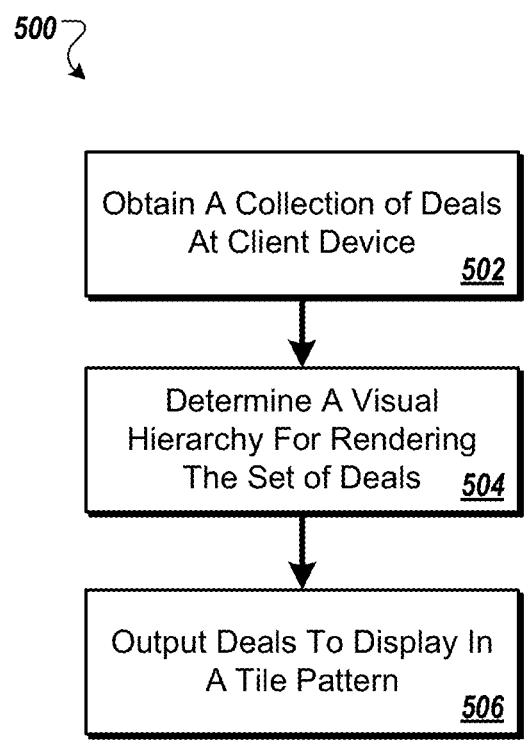
FIG. 5 is a flowchart of an example system that displays deals on a client device.

FIG. 5 shows a process 500 for displaying deals on a client device. Initially, in step 502, the client device obtains a set of deals, wherein each deal is associated with a relevance. When the client device 104 renders the selected deals in tile patterns, the order of deals in the visual hierarchy of the tile patterns may be based on the relative relevance of the selected deals. In particular, in step 504, the client device determines a visual hierarchy for rendering the set of deals, wherein a rank in the visual hierarchy of a representation of each deal is based on the relevance of the respective deal. For example, the deal with the highest relevance will have the highest rank in the visual hierarchy; the deal with the next highest relevance will have the next highest rank in the visual hierarchy, etc. In particular, a representation of the most relevant deal will include one or more features that promote it to the highest position in the visual hierarchy, such as, for example, the largest size, the top left position in the tile pattern, a bold color background and/or border, high contrast with other deals (e.g., a different font or text size), and or a different alignment (e.g., a 45 degree rotation from other tiles in the tile pattern) from the other tiles.

Finally, in step 506, the client device renders representations of the set of deals in a tile pattern on a display of the client device.

In some implementations, a representation of the first deal from the set may be rendered in a first tile having a first size, where the first size is based on the relevance of the first deal. Also, a representation of a second deal from the set is rendered in a second tile having a second size, where the second size is based on the relevance of the second deal. In a case where the relevance of the first deal is greater than the relevance of the second deal, the size of the first tile is larger than the size of the second tile. In other words, the size of each of the tiles is dependent on the relative relevance of the associated deal. Alternatively or in addition, the arrangement of the tiles (e.g., locations) in the tile pattern may depend on the relative relevance of the associated deals. Alternatively or in addition, the contrast of tiles (e.g., font style or font size) may be based on the relative relevance of the associated deals. Alternatively or in addition, the color of tiles may be based on the relative relevance of the associated deals (e.g., a first tile may have a bold colored background and/or border due to a high relevance). Alternatively or in addition, the alignment of tiles may be based on the relative relevance of the associated deals (e.g., a first tile may have an orientation 45 degrees offset from the orientation of other tiles in the tile pattern). In some implementations, the client device may provide a semantic zoom feature as described above.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

The features described can be implemented in digital electronic circuitry, or in computer hardware, firmware, software, or in combinations of them. The apparatus can be implemented in a non-transitory computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a client device having a display device such as a LCD (liquid crystal display) for displaying information to the user and a touchscreen (e.g., a presence-sensitive display) and/or a keyboard and a pointing device such as a mouse or a trackball by which the user can provide input to the client device. In some versions, the client device may also include a dialog based voice interface for interaction with a user.

The features can be implemented in a system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:
1. A computer-implemented method comprising:
  receiving, by a mobile application executing on a user computing device and from a server over a network, a collection of deals comprising a first deal and a second deal;
  providing, by the mobile application executing on the user computing device and to a display device of the user computing device, a user interface having an area that includes visible indicia of at least (i) a first representation of the first deal, and (ii) a second representation of the second deal;
  accessing, by the mobile application executing on the user computing device and at the user computing device, a user profile;
  receiving, by the mobile application executing on the user computing device and from an input device of the user computing device, a zoom input;
  responsive to receiving the zoom input:
  determining, by the mobile application executing on the user computing device and using a latent Dirichlet allocation (LDA) technique, a first relevance of the first deal based, in part, on the user profile and a first determined location associated with the first deal within a proximity of an identified location of the user computing device;
  determining, by the mobile application executing on the user computing device and using the LDA technique, a second relevance of the second deal, in part, based on the user profile and a second determined location associated with the second deal within the proximity of the identified location of the user computing device;
  comparing, by the mobile application executing on the user computing device, the first relevance to a predetermined threshold;
  comparing, by the mobile application executing on the user computing device, the second relevance to the predetermined threshold; and
  decreasing, by the mobile application executing on the user computing device and via the user interface provided to the display device of the user computing device, an absolute size of the first representation of the first deal and an absolute size of the second representation of the second deal while simultaneously increasing, by the mobile application executing on the user computing device and via the user interface provided to the display device of the user computing device, a size of the first representation of the first deal rendered as a first tile relative to the size of the second representation of the second deal rendered as a second tile, wherein the first deal is a different discount offering than the second deal, and the first tile is displayed larger than the second tile on the display device, wherein the increasing of the size of the first representation relative to the size of the second representation is based on the comparisons of the first relevance and the second relevance with the predetermined threshold.

2. The computer-implemented method of claim 1, wherein increasing a size of the first representation and decreasing a size of the second representation relative to the size of the first representation based on the comparisons of the first relevance and the second relevance with the predetermined threshold comprises:

determining that the first relevance of the first deal is greater than the predetermined threshold.

3. The computer-implemented method of claim 1, wherein increasing a size of the first representation and decreasing a size of the second representation relative to the size of the first representation based on the comparisons of the first relevance and the second relevance with the predetermined threshold comprises:

determining that the second relevance of the second deal is less than the predetermined threshold.

4. The computer-implemented method of claim 1, wherein increasing a size of the first representation and decreasing a size of the second representation relative to the size of the first representation based on the comparisons of the first relevance and the second relevance with the predetermined threshold comprises:

determining that the first relevance of the first deal is less than a maximum threshold and is greater than the second relevance;

determining that the second relevance of the second deal is greater than a minimum threshold and is less than the first relevance and the maximum threshold;

displaying the first representation in a first portion of the area; and displaying the second representation in a second portion of the area, the second portion being smaller than the first portion.

5. The computer-implemented method of claim 1, wherein:

determining a first relevance of the first deal based on the user profile comprises comparing a location in the user profile with a first location associated with the first deal; and determining a second relevance of the second deal based on the user profile comprises comparing the location in the user profile with a second location associated with the second deal.

6. The computer-implemented method of claim 1, wherein:

the user profile is stored in the user computing device;

the user profile includes information indicating one or more of a behavior of a user, an interest of the user, a location associated with the user, a device associated with the user, an input received from the user, an action associated with the user, and a frequency of the action; and each of the first deal and the second deal includes an indication of a monetary discount.

7. The computer-implemented method of claim 1, further comprising:

responsive to determining the first relevance of the first deal and the second relevance of the second deal, determining a visual hierarchy for displaying the first deal and the second deal, wherein:

the visual hierarchy is directly proportional to a relevance of a deal based on the user profile stored in the user computing device; and the visual hierarchy is visually represented by features that include one or more of a symmetry, a proximity, a density, a repetition, and a texture.

8. A non-transitory computer-readable storage medium encoded with a mobile application, the mobile application comprising instructions that, upon execution by a user computing device, cause the user computing device to perform operations comprising:

receiving, by the mobile application executing on the user computing device and from a server over a network, a collection of deals comprising a first deal and a second deal;

providing, by the mobile application executing on the user computing device and to a display device of the user computing device, a user interface having an area that includes visible indicia of at least (i) a first representation of the first deal, and (ii) a second representation of the second deal;

accessing, by the mobile application executing on the user computing device and at the user computing device, a user profile;

receiving, by the mobile application executing on the user computing device and from an input device of the user computing device, a zoom input;

responsive to receiving the zoom input:

determining, by the mobile application executing on the user computing device and using a latent Dirichlet allocation (LDA) technique, a first relevance of the first deal based, in part, on the user profile and a first determined location associated with the first deal within a proximity of an identified location of the user computing device;

determining, by the mobile application executing on the user computing device and using the LDA technique, a second relevance of the second deal based, in part, on the user profile and a second determined location associated with the second deal within the proximity of the identified location of the user computing device;

comparing, by the mobile application executing on the user computing device, the first relevance to a predetermined threshold;

comparing, by the mobile application executing on the user computing device, the second relevance to the predetermined threshold; and decreasing, by the mobile application executing on the user computing device and via the user interface provided to the display device of the user computing device, an absolute size of the first representation of the first deal and an absolute size of the second representation of the second deal while simultaneously increasing, by the mobile application executing on the user computing device and via the user interface provided to the display device of the user computing device, a size of the first representation of the first deal rendered as a first tile relative to the size of the second representation of the second deal rendered as a second tile, wherein the first deal is a different discount offering than the second deal, and the first tile is displayed larger than the second tile on the display device, wherein the increasing of the size of the first representation relative to the size of the second representation is based on the comparisons of the first relevance and the second relevance with the predetermined threshold.

9. The non-transitory computer-readable storage medium of claim 8, wherein increasing a size of the first representation and decreasing a size of the second representation relative to the size of the first representation based on the comparisons of the first relevance and the second relevance with the predetermined threshold comprises:

determining that the first relevance of the first deal is greater than the predetermined threshold.

10. The non-transitory computer-readable storage medium of claim 8, wherein increasing a size of the first representation and decreasing a size of the second representation relative to the size of the first representation based on the comparisons of the first relevance and the second relevance with the predetermined threshold comprises:

determining that the second relevance of the second deal is less than the predetermined threshold.

11. The non-transitory computer-readable storage medium of claim 8, wherein increasing a size of the first representation and decreasing a size of the second representation relative to the size of the first representation based on the comparisons of the first relevance and the second relevance with the predetermined threshold comprises:

determining that the first relevance of the first deal is less than a maximum threshold and is greater than the second relevance;

determining that the second relevance of the second deal is greater than a minimum threshold and is less than the first relevance and the maximum threshold;

displaying the first representation in a first portion of the area; and displaying the second representation in a second portion of the area, the second portion being smaller than the first portion.

12. The non-transitory computer-readable storage medium of claim 8, wherein:

determining a first relevance of the first deal based on the user profile comprises comparing a location in the user profile with a first location associated with the first deal; and determining a second relevance of the second deal based on the user profile comprises comparing the location in the user profile with a second location associated with the second deal.

13. The non-transitory computer-readable storage medium of claim 8, wherein:

the user profile includes information indicating one or more of a behavior of a user, an interest of the user, a location associated with the user, a device associated with the user, an input received from the user, an action associated with the user, and a frequency of the action; and each of the first deal and the second deal includes an indication of a monetary discount.

14. The non-transitory computer-readable storage medium of claim 8, wherein the operations further comprise:

responsive to determining the first relevance of the first deal and the second relevance of the second deal, determining a visual hierarchy for displaying the first deal and the second deal, wherein:

the visual hierarchy is directly proportional to a relevance of a deal based on the user profile stored in the user computing device; and the visual hierarchy is visually represented by features that include one or more of a symmetry, a proximity, a density, a repetition, and a texture.

15. A system comprising:

one or more processors and one or more computer storage media storing instructions that are operable and when executed by the one or more processors, cause the one or more processors to perform operations comprising:

receiving, by a mobile application executing on a user computing device and from a server over a network, a collection of deals comprising a first deal and a second deal;

providing, by the mobile application executing on the user computing device and to a display device of the user computing device, a user interface of a display device having an area that includes visible indicia of at least (i) a first representation of the first deal, and (ii) a second representation of the second deal;

accessing, by the mobile application executing on the user computing device and at the user computing device, a user profile;

receiving, by the mobile application executing on the user computing device and from an input device of the user computing device, a zoom input;

responsive to receiving the zoom input:

determining, by the mobile application executing on the user computing device and using a latent Dirichlet allocation (LDA) technique, a first relevance of the first deal based, in part, on the user profile and a first determined location associated with the first deal within a proximity of an identified location of the user computing device;

determining, by the mobile application executing on the user computing device and using the LDA technique, a second relevance of the second deal based, in part, on the user profile and a second determined location associated with the first deal within a proximity of the identified location of the user computing device;

comparing, by the mobile application executing on the user computing device, the first relevance to a predetermined threshold;

comparing, by the mobile application executing on the user computing device, the second relevance to the predetermined threshold; and decreasing, by the mobile application executing on the user computing device and via the user interface provided to the display device of the user computing device, an absolute size of the first representation of the first deal and an absolute size of the second representation of the second deal while simultaneously increasing, by the mobile application executing on the user computing device and via the user interface provided to the display device of the user computing device, a size of the first representation of the first deal rendered as a first tile relative to the size of the second representation of the second deal rendered as a second tile, wherein the first deal is a different discount offering than the second deal, and the first tile is displayed larger than the second tile on the display device, wherein the increasing of the size of the first representation relative to the size of the second representation is based on the comparisons of the first relevance and the second relevance with the predetermined threshold.

16. The system of claim 15, wherein increasing a size of the first representation and decreasing a size of the second representation relative to the size of the first representation based on the comparisons of the first relevance and the second relevance with the predetermined threshold comprises:
determining that the first relevance of the first deal is greater than the predetermined threshold.

17. The system of claim 15, wherein increasing a size of the first representation and decreasing a size of the second representation relative to the size of the first representation based on the comparisons of the first relevance and the second relevance with the predetermined threshold comprises:
determining that the second relevance of the second deal is less than the predetermined threshold.

18. The system of claim 15, wherein increasing a size of the first representation and decreasing a size of the second representation relative to the size of the first representation based on the comparisons of the first relevance and the second relevance with the predetermined threshold comprises:
determining that the first relevance of the first deal is less than a maximum threshold and is greater than the second relevance;
determining that the second relevance of the second deal is greater than a minimum threshold and is less than the first relevance and the maximum threshold;
displaying the first representation in a first portion of the area; and
displaying the second representation in a second portion of the area, the second portion being smaller than the first portion.

19. The system of claim 15, wherein:
determining a first relevance of the first deal based on the user profile comprises comparing a location in the user profile with a first location associated with the first deal; and
determining a second relevance of the second deal based on the user profile comprises comparing the location in the user profile with a second location associated with the second deal.

20. The system of claim 15, wherein:
the user profile is stored in the user computing device;
the user profile includes information indicating one or more of a behavior of a user, an interest of the user, a location associated with the user, a device associated with the user, an input received from the user, an action associated with the user, and a frequency of the action; and each of the first deal and the second deal includes an indication of a monetary discount.

21. The system of claim 15, wherein the operations further comprise:
responsive to determining the first relevance of the first deal and the second relevance of the second deal, determining a visual hierarchy for displaying the first deal and the second deal,
wherein:
the visual hierarchy is directly proportional to a relevance of a deal based on the user profile stored in the user computing device; and
the visual hierarchy is visually represented by features that include one or more of a symmetry, a proximity, a density, a repetition, and a texture.

22. The computer-implemented method of claim 1, wherein the user profile includes information indicating one or more of a behavior of the user, an interest of the user, a location associated with the user, a device associated with the user, an input received from the user, an action associated with the user, and a frequency of the action; and the user computing device is configured to train the user profile by presenting the user with a series of candidate deals to rank values for a variety of attributes.

23. The computer-implemented method of claim 1, further comprising a replicated user profile configured to be created by the user and maintained on another device controlled by the user.

24. The non-transitory computer-readable storage medium of claim 8, further comprising a replicated user profile configured to be created by the user and maintained on another device controlled by the user.

25. The non-transitory computer-readable storage medium of claim 8 wherein the user profile includes information indicating one or more of a behavior of the user, an interest of the user, a location associated with the user, a device associated with the user, an input received from the user, an action associated with the user, and a frequency of the action; and the user computing device is configured to train the user profile by presenting the user with a series of candidate deals to rank values for a variety of attributes.

26. The system of claim 15, further comprising a replicated user profile configured to be created by the user and maintained on another device controlled by the user.

27. The system of claim 15, wherein the user profile includes information indicating one or more of a behavior of the user, an interest of the user, a location associated with the user, a device associated with the user, an input received from the user, an action associated with the user, and a frequency of the action; and the user computing device is configured to train the user profile by presenting the user with a series of candidate deals to rank values for a variety of attributes.

* * * * *